United States Patent
Vijayakumar et al.

(10) Patent No.: US 11,292,534 B2
(45) Date of Patent: Apr. 5, 2022

(54) VEHICLE CARGO BOX FLOOR-TO-SIDEWALL MATING CONFIGURATIONS

(71) Applicant: FORD GLOBAL TECHNOLOGIES, LLC, Dearborn, MI (US)

(72) Inventors: Srinath Vijayakumar, Farmington, MI (US); Vince Anthony Chimento, Plymouth, MI (US); Jeffrey Gray, Dearborn, MI (US); Eric B. Childers, Detroit, MI (US); Eric Joseph, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 183 days.

(21) Appl. No.: 16/822,362

(22) Filed: Mar. 18, 2020

(65) Prior Publication Data

US 2021/0291913 A1    Sep. 23, 2021

(51) Int. Cl.
*B62D 33/077*    (2006.01)
*B62D 33/02*    (2006.01)

(52) U.S. Cl.
CPC ....... *B62D 33/0222* (2013.01); *B62D 33/077* (2013.01)

(58) Field of Classification Search
CPC .. B62D 33/0222; B62D 33/077; B62D 21/00; B62D 21/02; B62D 21/09; B62D 24/00; B62D 24/02; B62D 33/04; B62D 33/044; B62D 33/046
USPC .......................................................... 296/36
See application file for complete search history.

(56) References Cited

U.S. PATENT DOCUMENTS

| | | | | |
|---|---|---|---|---|
| 3,084,971 A | * | 4/1963 | Schilberg | B60K 13/06 296/35.1 |
| 3,157,428 A | * | 11/1964 | Kishline | B62D 21/09 296/204 |
| 3,188,131 A | * | 6/1965 | Attwood | B62D 33/046 52/270 |
| RE25,914 E | * | 11/1965 | Richter et al. | B62D 33/046 296/186.1 |
| 5,172,953 A | | 12/1992 | Chamberlain | |
| 5,730,486 A | | 3/1998 | Jurica | |
| 6,003,923 A | | 12/1999 | Scott et al. | |
| 6,076,693 A | | 6/2000 | Reiter et al. | |
| 8,449,022 B2 | * | 5/2013 | Pencak | B62D 25/2054 296/193.07 |

FOREIGN PATENT DOCUMENTS

| | | | | |
|---|---|---|---|---|
| CN | 112278073 A | * | 1/2021 | |
| CN | 112319615 A | * | 2/2021 | |
| FR | 2873636 A1 | * | 2/2006 | B62D 33/046 |
| WO | WO-2007012710 A1 | * | 2/2007 | B62D 29/045 |

* cited by examiner

*Primary Examiner* — Hilary L Gutman
(74) *Attorney, Agent, or Firm* — Vichit Chea; Carlson, Gaskey & Olds, P.C.

(57) ABSTRACT

Exemplary vehicle truck bed assemblies may include a unibody construction. A cargo box of an exemplary truck bed assembly may include at least two different floor-to-side wall mating configurations, and each of the at least two different mating configurations is non-visible from within a cargo space established by the cargo box. In addition, each of the at least two different mating configurations may include a fastener, such as a weld, an adhesive, and/or a bolt, for adjoining adjacent mating surfaces of the cargo box floor and side wall.

19 Claims, 4 Drawing Sheets

VEHICLE CARGO BOX FLOOR-TO-SIDEWALL MATING CONFIGURATIONS

TECHNICAL FIELD

This disclosure relates to vehicle cargo boxes that include non-visible floor-to-sidewall mating surfaces.

BACKGROUND

Vehicle cargo boxes establish a cargo space for transporting various types of cargo. The cargo boxes include a floor that is adjoined to a pair of longitudinally extending side walls. A corrosion protection sealant is typically applied in a seam that extends between a vertical flange of the floor and an exterior surface of each of the side walls that faces into the cargo box. The sealant is visible along the seam and is often covered by a bed liner to meet customer craftsmanship expectations.

SUMMARY

A truck bed assembly according to an exemplary aspect of the present disclosure includes, among other things, a vehicle frame including a longitudinally extending frame rail, and a cargo box supported on the vehicle frame and including a floor and a side wall. A first mounting flange of the floor extends between a first mounting flange of the side wall and a first mounting flange of the longitudinally extending frame rail. A fastener joins together the first mounting flange of the floor, the first mounting flange of the side wall, and the first mounting flange of the longitudinally extending frame rail.

In a further non-limiting embodiment of the forgoing truck bed assembly, the truck bed assembly includes a unibody construction.

In a further non-limiting embodiment of either of the foregoing truck bed assemblies, the vehicle frame includes a second longitudinally extending frame rail and at least one cross member that extends between the longitudinally extending frame rail and the second longitudinally extending frame rail.

In a further non-limiting embodiment of any of the foregoing truck bed assemblies, the fastener is a weld or an adhesive.

In a further non-limiting embodiment of any of the foregoing truck bed assemblies, the fastener is located outboard of an interior surface of the side wall. The interior surface of the side wall faces in a direction away from a cargo space established by the cargo box.

In a further non-limiting embodiment of any of the foregoing truck bed assemblies, the fastener is non-visible from within the cargo box.

In a further non-limiting embodiment of any of the foregoing truck bed assemblies, a second mounting flange of the floor is received against a second mounting flange of the side wall, and a second fastener joins together the second mounting flange of the floor and the second mounting flange of the side wall.

In a further non-limiting embodiment of any of the foregoing truck bed assemblies, the second fastener is located beneath the floor and is therefore non-visible from within the cargo box.

In a further non-limiting embodiment of any of the foregoing truck bed assemblies, a third mounting flange of the floor extends between a third mounting flange of the side wall and a reinforcing cap that extends between the floor and the longitudinally extending frame rail. A third fastener joins together the third mounting flange of the floor, the third mounting flange of the side wall, and the reinforcing cap.

In a further non-limiting embodiment of any of the foregoing truck bed assemblies, the third fastener is located outboard of an interior surface of the side wall. The third fastener is non-visible from within the cargo box.

In a further non-limiting embodiment of any of the foregoing truck bed assemblies, the first fastener and the second fastener are welds and the third fastener is a bolt.

In a further non-limiting embodiment of any of the foregoing truck bed assemblies, the first mounting flange of the floor extends beneath a wheel well of the side wall.

A vehicle according to another exemplary aspect of the present disclosure includes, among other things, a unibody truck bed assembly including a cargo box and an integrated vehicle frame. The cargo box includes a floor and a side wall. The cargo box includes at least two different mating configurations between the floor and the sidewall. Each of the at least two different mating configurations are non-visible from within a cargo space established by the cargo box.

In a further non-limiting embodiment of the foregoing vehicle, the vehicle is a pickup truck.

In a further non-limiting embodiment of either of the foregoing vehicles, one of the at least two different mating configurations is located at a first location along the length of the side wall and includes a first mounting flange of the floor extending between a first mounting flange of the side wall and a first mounting flange of a longitudinally extending frame rail of the integrated vehicle frame. A weld or an adhesive joins together the first mounting flange of the floor, the first mounting flange of the side wall, and the first mounting flange of the longitudinally extending frame rail.

In a further non-limiting embodiment of any of the foregoing vehicles, one of the at least two different mating configurations is located at a second location along the length of the side wall and includes a vertical mounting flange of the floor received against a vertical mounting flange of the side wall. A weld or an adhesive joins together the vertical mounting flange of the floor and the vertical mounting flange of the side wall.

In a further non-limiting embodiment of any of the foregoing vehicles, one of the at least two different mating configurations is located at a third location along the length of the side wall and includes a third mounting flange of the floor extending between a third mounting flange of the side wall and a reinforcing cap that extends between the floor and a longitudinally extending frame rail of the integrated vehicle frame. A bolt joins together the third mounting flange of the floor, the third mounting flange of the side wall, and the reinforcing cap.

In a further non-limiting embodiment of any of the foregoing vehicles, a weld or an adhesive is located outboard of the bolt and joins together the third mounting flange of the floor, the reinforcing cap, and a mounting flange of the longitudinally extending frame rail.

In a further non-limiting embodiment of any of the foregoing vehicles, the cargo box includes at least three different mating configurations between the floor and the sidewall. Each of the at least three different mating configurations is non-visible from within the cargo space.

In a further non-limiting embodiment of any of the foregoing vehicles, a first mating configuration of the at least two different mating configurations includes a weld located outboard of an interior surface of the side wall, and a second mating configuration of the at least two different mating configurations includes a bolt located outboard of the interior surface of the side wall.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary vehicle truck bed assemblies that include a unibody construction. A cargo box of an exemplary truck bed assembly may include at least two different floor-to-side wall mating configurations, and each of the at least two different mating configurations is non-visible from within a cargo space established by the cargo box. In addition, each of the at least two different mating configurations may include a fastener, such as a weld, an adhesive, and/or a bolt, for adjoining adjacent mating surfaces of the cargo box floor and side wall. These and other features of this disclosure are described in greater detail in the following paragraphs of this detailed description.

Figure 1:
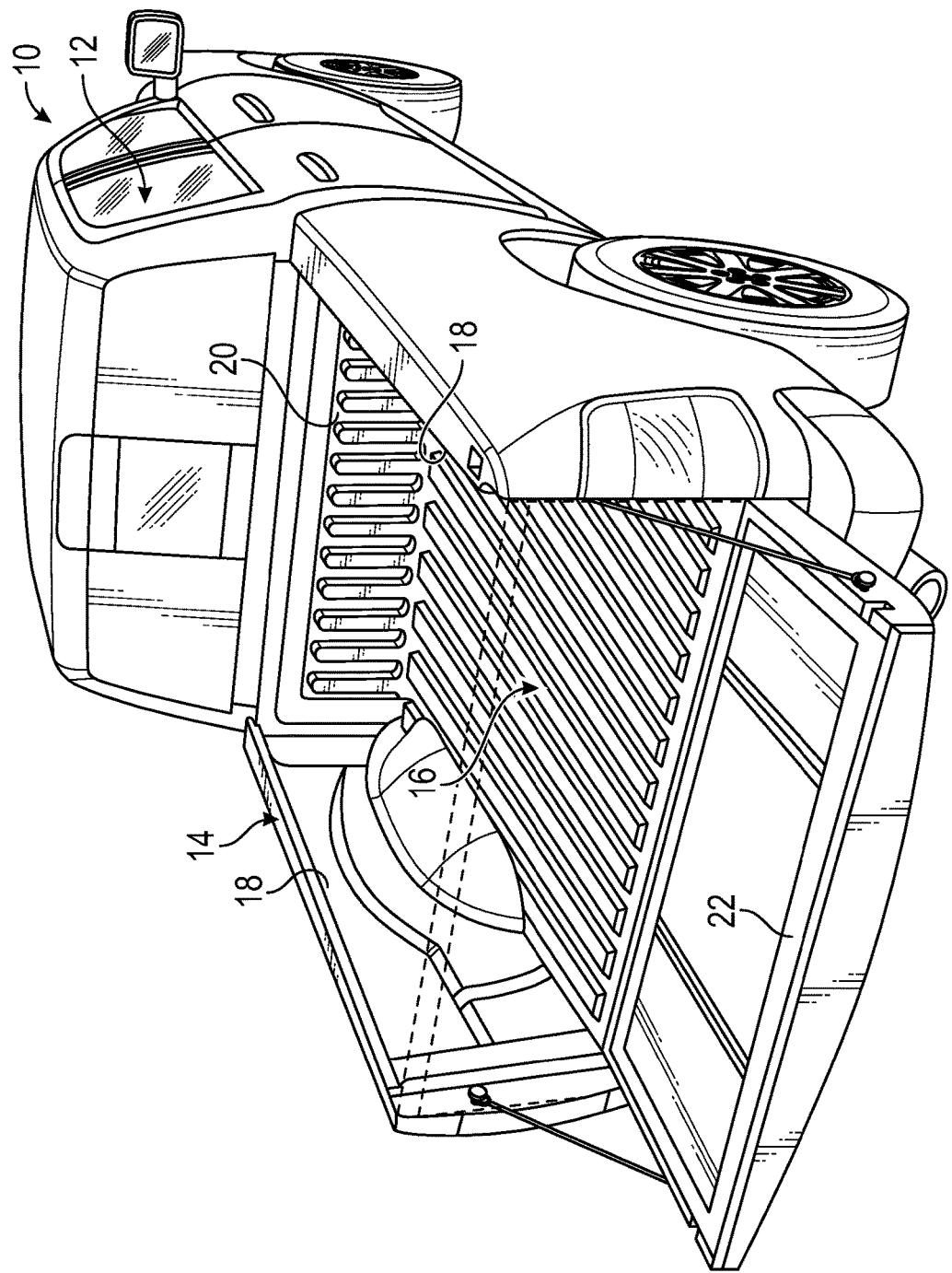
FIG. 1 is a rear perspective view of a vehicle that is configured as a pickup truck.
Figure 2:
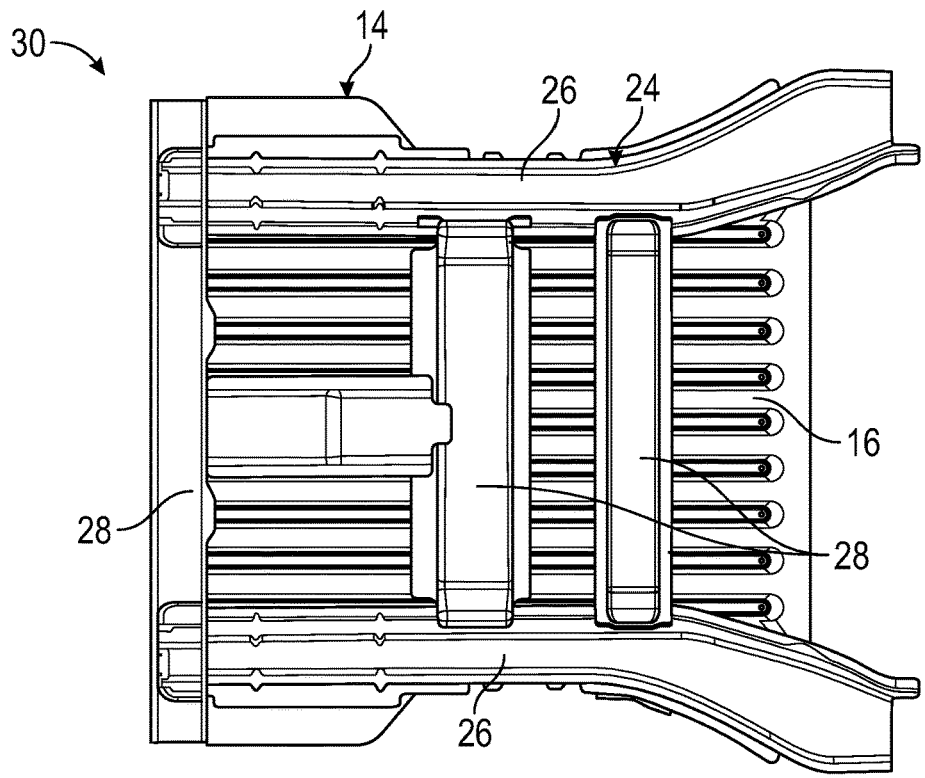
FIG. 2 is a bottom view of a truck bed assembly of the pickup truck of FIG. 1.

FIGS. 1 and 2 schematically illustrate select portions of a vehicle 10, which in an exemplary embodiment is configured as a pickup truck. Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may include a passenger cabin 12 and a cargo box 14 disposed rearward of the passenger cabin 12. The cargo box 14 establishes a cargo space for storing and hauling cargo on the vehicle 10. The cargo box 14 may include a floor 16 that extends laterally between a pair of opposing longitudinally extending side walls 18 and longitudinally between a header 20 that is adjacent to the passenger cabin 12 and a tailgate 22 that is disposed on an opposite end from the passenger cabin 12. The tailgate 22 is movable (e.g., pivotable) between an open position and a closed position (shown in phantom) in order to load/unload cargo into/from the cargo box 14.

The cargo box 14, and in particular the floor 16, may be supported by portions of a vehicle frame 24. The vehicle frame 24 may include a pair of longitudinal frame rails 26 and one or more cross members 28 that extend between the longitudinal frame rails 26 (see, e.g., FIG. 2). Together, the longitudinal frame rails 26 and the cross members 28 support the cargo box 14, which is disposed on top of the vehicle frame 24.

The cargo box 14 and the vehicle frame 24 may be collectively referred to as a truck bed assembly 30 of the vehicle 10. In an embodiment, the truck bed assembly 30 includes a unibody construction in which the components of the cargo box 14 and the vehicle frame 24 are integrated together as single unit, such as by welding.

Figure 3:
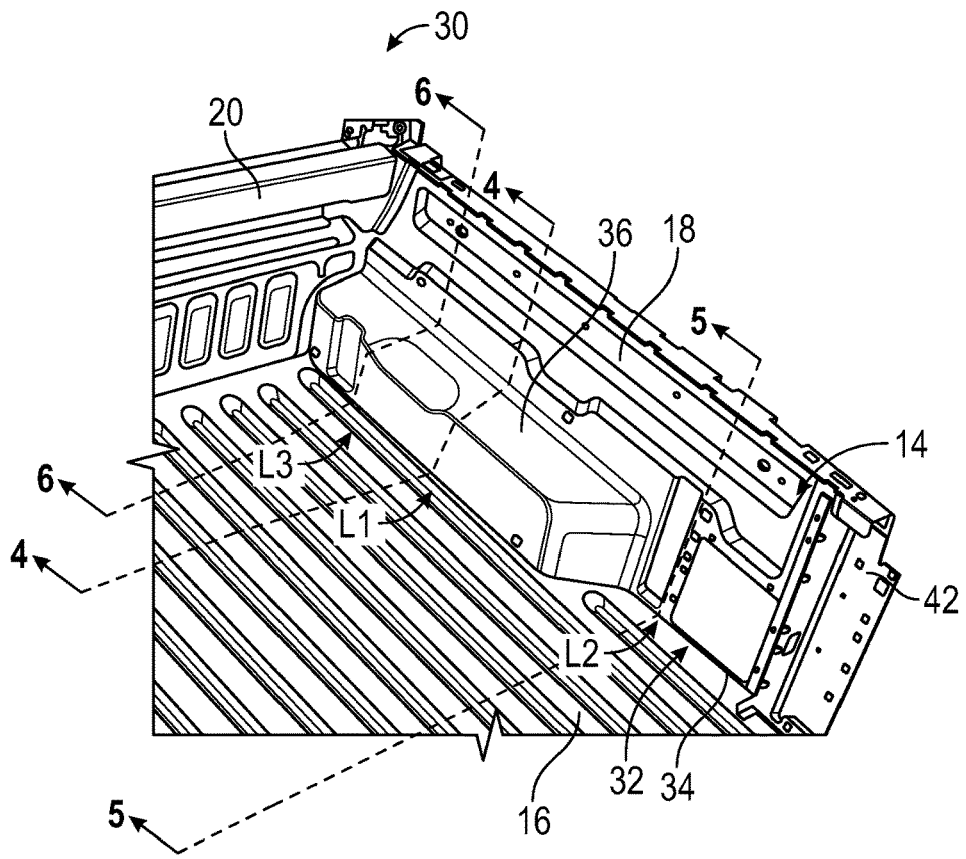
FIG. 3 illustrates select portions of a truck bed assembly.

FIG. 3, with continued reference to FIGS. 1-2, illustrates select portions of the truck bed assembly 30 of the vehicle 10. A lateral edge portion 32 of the floor 16 of the cargo box 14 meets the side wall 18 of the cargo box 14 at a seam 34. The seam 34 extends longitudinally across an entire length of the floor 16 between the header 20 and the tailgate 22. Although only one side wall 18 is illustrated in FIG. 3, a substantially identical seam would be provided where an opposite lateral edge portion of the floor 16 meets the opposite side wall.

In prior cargo box designs, a sealant is typically required to seal the seam 34 for corrosion protection. The sealant is typically visible from within the cargo box 14 and can be unsightly to some customers. Some customers may therefore choose to cover the sealant with a bed liner, however, this solution is relatively expensive and may not meet customer craftsmanship expectations. This disclosure therefore proposes improved floor-to-sidewall cargo box mating configurations that substantially eliminate unsightly sealing interfaces and the need for expensive bed liners.

Figure 4:
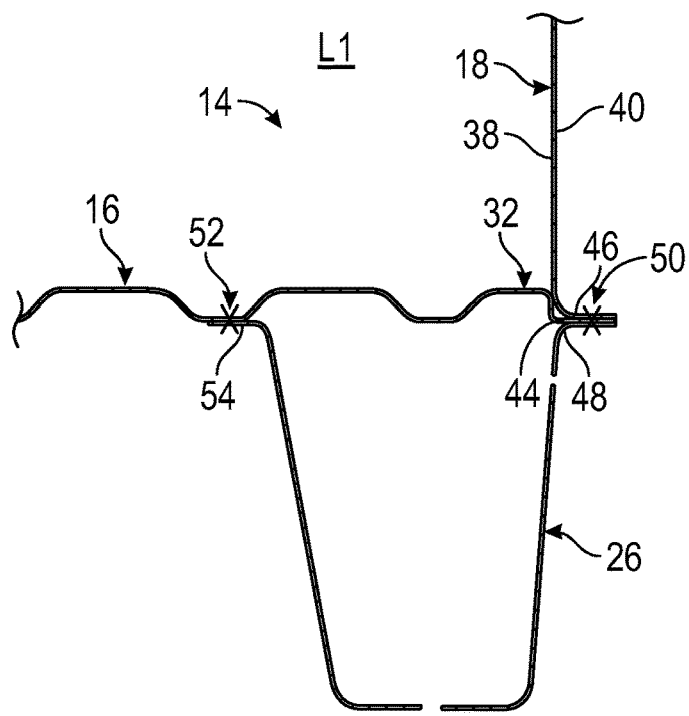
FIG. 4 is a cross-sectional view through section 4-4 of FIG. 3.
Figure 5:
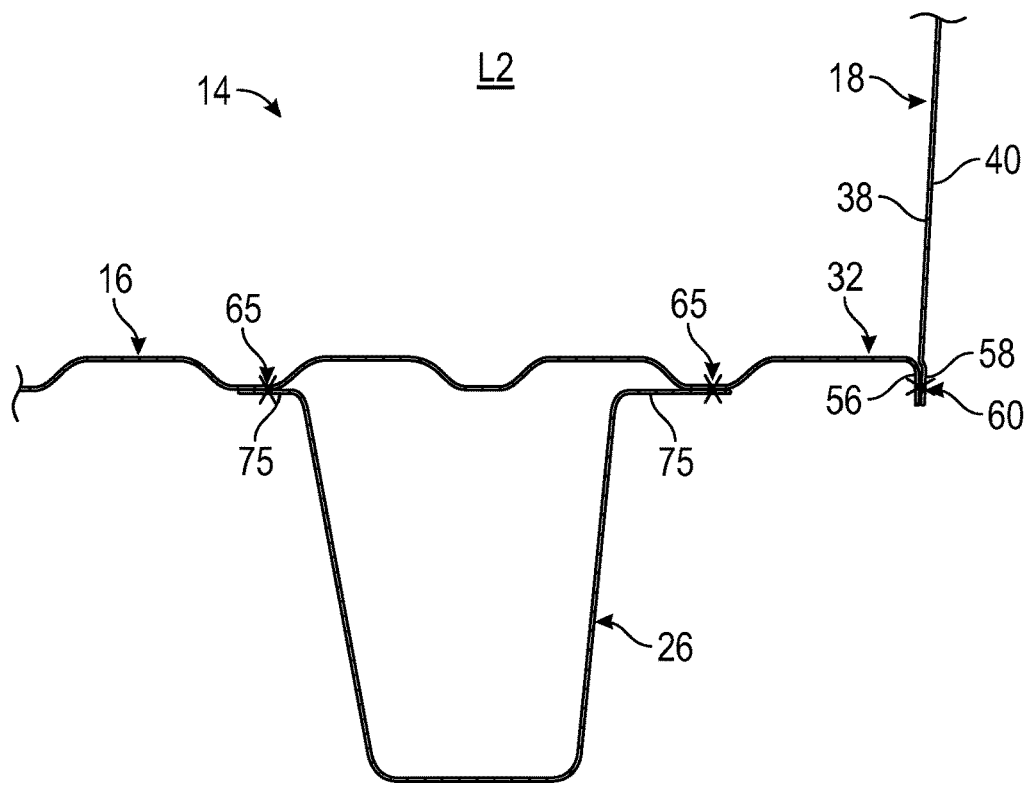
FIG. 5 is a cross-sectional view through section 5-5 of FIG. 3.
Figure 6:
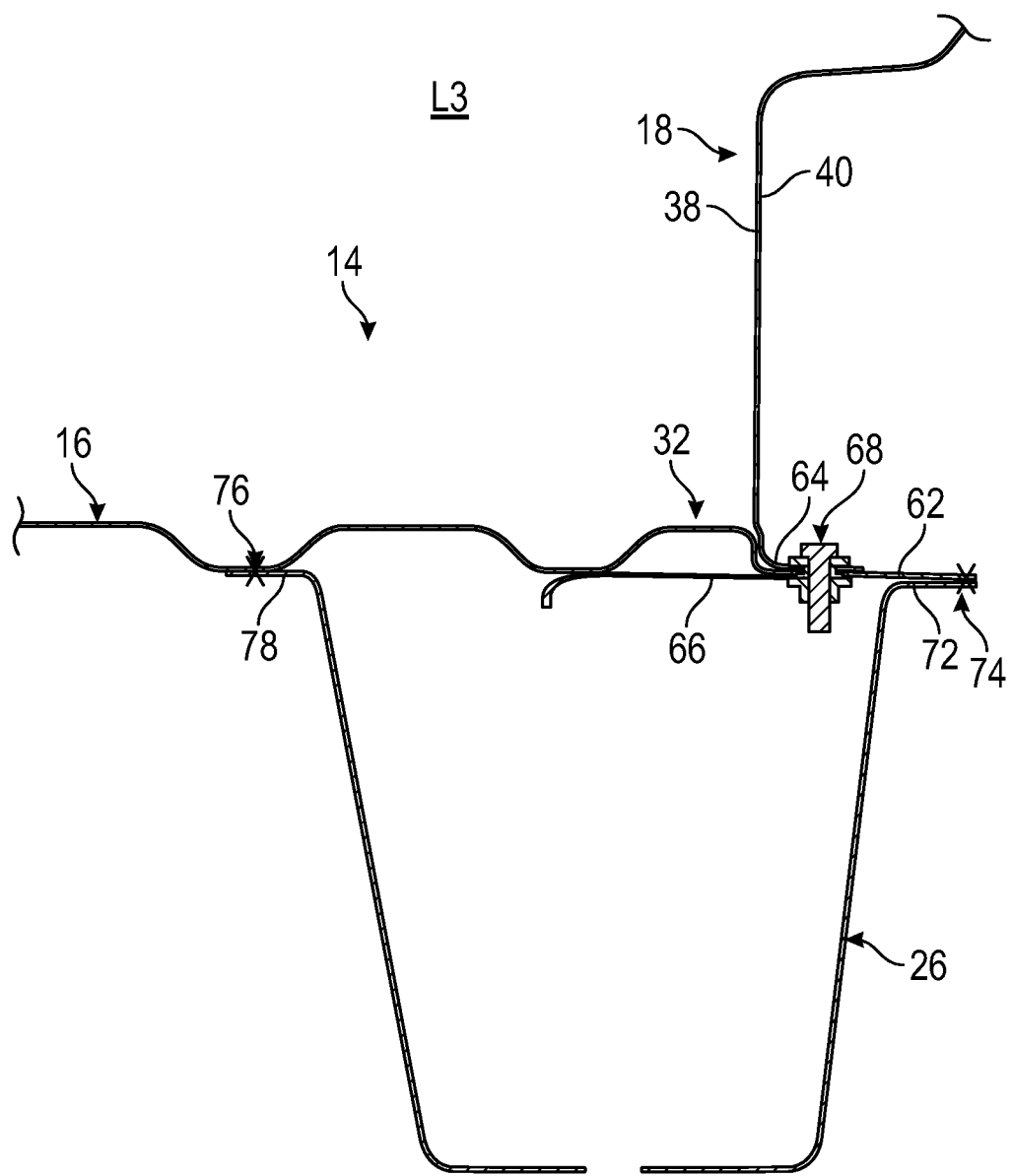
FIG. 6 is a cross-sectional view through section 6-6 of FIG. 3.

FIGS. 4, 5, and 6 are cross-sectional views that illustrate exemplary floor 16-to-sidewall 18 mating configurations of the cargo box 14 of the truck bed assembly 30. The exemplary mating configurations shown in FIGS. 4-6 are non-visible when viewed from inside the cargo box 14 and do not require the application of sealant within the seams 34, thereby reducing manufacturing costs and improving customer satisfaction.

FIG. 4, with continued reference to FIG. 3, illustrates a first floor 16-to-sidewall 18 mating configuration of a first location L1 of the cargo box 14. The first location L1 is near an approximate mid-point of a wheel well 36 of the side wall 18 of the cargo box 14.

The side wall 18 includes an outer surface 38 and an inner surface 40. The outer surface 38 faces into the cargo box 14, and the inner surface 40 faces away from the cargo box 14 (i.e., in a direction toward a body side panel 42 (see FIG. 3) of the truck bed assembly 30).

The floor 16 includes a first mating flange 44 extending at the lateral edge portion 32 of the floor 16. The first mating flange 44 may be received between a first mating flange 46 of the side wall 18 and a first mating flange 48 of a frame rail 26 of the vehicle frame 24. In an embodiment, each of the first mating flanges 44, 46, 48 is a horizontal flange.

The first mating flanges 44, 46, 48 may be joined together by a fastener 50, which is shown schematically with an "X." The fastener 50 may be a weld or an adhesive, for example, and is configured to both adjoin and seal the joint between the first mating flanges 44, 46, 48. In an embodiment, the fastener 50 is provided at a location that is outboard of the inner surface 40 of the side wall 18 (i.e., axially between the side wall 18 and the body side panel 42). The fastener 50 is therefore non-visible from within the cargo box 14. Another fastener 52 (e.g., weld) may be provided to join an additional mounting flange 54 of the frame rail 26 to the floor 16.

FIG. 5, with continued reference to FIG. 3, illustrates a second floor 16-to-sidewall 18 mating configuration of a second location L2 of the cargo box 14. The second location L2 is aft of the first location L1, and the cross-section of FIG. 5 extends through a portion of the side wall 18 that is aft of the wheel well 36 of the side wall 18 of the cargo box 14.

The floor 16 includes a second mating flange 56 extending at the lateral edge portion 32 of the floor 16. The second mating flange 56 may be received against a second mating flange 58 of the side wall 18. In an embodiment, each of the second mating flanges 56, 58 are vertical flanges that extend in a downward direction (i.e., in a direction extending from the floor 16 toward a ground level upon which the vehicle 10 is situated).

The second mating flanges 56, 58 may be joined together by an additional fastener 60, which is shown schematically with an "X." The fastener 60 may be a weld or an adhesive, for example, and is configured to both adjoin the second mating flanges 56, 58 and seal the joint between the second mating flanges 56, 58. In an embodiment, the fastener 60 is provided at the outer surface 38 of the side wall 18 and at a location that is beneath the floor 18. The fastener 60 is therefore non-visible from within the cargo box 14. Another fasteners 65 (e.g., welds) may be provided to join mounting flanges 75 of the frame rail 26 to the floor 16.

FIG. 6, with continued reference to FIG. 3, illustrates a third floor 16-to-sidewall 18 mating configuration of a third location L3 of the cargo box 14. The third location L3 is fore of the first location L1 (i.e., between the header 20 and the first location L1), and the cross-section of FIG. 6 extends through the wheel well 36 of the side wall 18 of the cargo box 14.

The floor 16 includes a third mating flange 62 extending at the lateral edge portion 32 of the floor 16. The third mating flange 62 may be received between a third mating flange 64 of the side wall 18 and a reinforcing cap 66 that extends between the floor 16 and the frame rail 26. In an embodiment, the third mating flanges 62, 64 are horizontal flanges.

The third mating flanges 62, 64 and the reinforcing cap 66 may be joined together by a fastener 68. The fastener 68 may be a bolt or an adhesive, for example, and is configured to both adjoin and seal the joint between the third mating flanges 62, 64 and the reinforcing cap 66. In an embodiment, the fastener 68 is provided at a location that is outboard of the inner surface 40 of the side wall 18 (i.e., axially between the side wall 18 and the body side panel 42). The fastener 68 is therefore non-visible from within the cargo box 14.

The third mating flange 62 of the floor 16, the reinforcing cap 66, and a third mating flange 72 of the frame rail 26 may be joined together by an additional fastener 74. The fastener 74 may be a weld or an adhesive. In an embodiment, the fastener 74 is provided at a location that is outboard of the fastener 68. The fastener 74 is therefore also non-visible from within the cargo box 14. Yet another fastener 76 (e.g., weld) may be provided to join an additional mounting flange 78 of the frame rail 26 to the floor 16.

The unibody truck bed assemblies of this disclosure provide improved cargo box floor-to-sidewall mating configurations. The exemplary mating configurations are non-visible from within the cargo box and do not require the application of sealant within seams extending between the floor and the sidewalls. The proposed configurations thereby reduce manufacturing costs and improve customer satisfaction.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A truck bed assembly, comprising:
   a vehicle frame including a longitudinally extending frame rail;
   a cargo box supported on the vehicle frame and including a floor and a side wall;
   a first mounting flange of the floor extending between a first mounting flange of the side wall and a first mounting flange of the longitudinally extending frame rail; and
   a fastener joining together the first mounting flange of the floor, the first mounting flange of the side wall, and the first mounting flange of the longitudinally extending frame rail.

2. The truck bed assembly as recited in claim 1, wherein the truck bed assembly includes a unibody construction.

3. The truck bed assembly as recited in claim 1, wherein the vehicle frame includes a second longitudinally extending frame rail and at least one cross member that extends between the longitudinally extending frame rail and the second longitudinally extending frame rail.

4. The truck bed assembly as recited in claim 1, wherein the fastener is a weld or an adhesive.

5. The truck bed assembly as recited in claim 1, wherein the fastener is located outboard of an interior surface of the side wall, wherein the interior surface of the side wall faces in a direction away from a cargo space established by the cargo box.

6. The truck bed assembly as recited in claim 1, wherein the fastener is non-visible from within the cargo box.

7. The truck bed assembly as recited in claim 1, wherein a second mounting flange of the floor is received against a second mounting flange of the side wall, and comprising a second fastener joining together the second mounting flange of the floor and the second mounting flange of the side wall.

8. The truck bed assembly as recited in claim 7, wherein the second fastener is located beneath the floor and is therefore non-visible from within the cargo box.

9. The truck bed assembly as recited in claim 7, wherein a third mounting flange of the floor extends between a third mounting flange of the side wall and a reinforcing cap that extends between the floor and the longitudinally extending frame rail, and further comprising a third fastener joining together the third mounting flange of the floor, the third mounting flange of the side wall, and the reinforcing cap.

10. The truck bed assembly as recited in claim 9, wherein the third fastener is located outboard of an interior surface of the side wall, and wherein the third fastener is non-visible from within the cargo box.

11. The truck bed assembly as recited in claim 9, wherein the first fastener and the second fastener are welds and the third fastener is a bolt.

12. The truck bed assembly as recited in claim 1, wherein the first mounting flange of the floor extends beneath a wheel well of the side wall.

13. A vehicle, comprising:
a unibody truck bed assembly comprised of a cargo box and an integrated vehicle frame,
wherein the cargo box includes a floor and a side wall,
wherein the cargo box includes at least three different mating configurations between the floor and the sidewall, and
wherein each of the at least three different mating configurations is non-visible from within a cargo space established by the cargo box.

14. The vehicle as recited in claim 13, wherein the vehicle is a pickup truck.

15. The vehicle as recited in claim 13, wherein one of the at least three different mating configurations is located at a first location along the length of the side wall and includes a first mounting flange of the floor extending between a first mounting flange of the side wall and a first mounting flange of a longitudinally extending frame rail of the integrated vehicle frame, and further comprising a weld or an adhesive that joins together the first mounting flange of the floor, the first mounting flange of the side wall, and the first mounting flange of the longitudinally extending frame rail.

16. The vehicle as recited in claim 13, wherein one of the at least three different mating configurations is located at a second location along the length of the side wall and includes a vertical mounting flange of the floor received against a vertical mounting flange of the side wall, and further comprising a weld or an adhesive that joins together the vertical mounting flange of the floor and the vertical mounting flange of the side wall.

17. The vehicle as recited in claim 13, wherein one of the at least three different mating configurations is located at a third location along the length of the side wall and includes a third mounting flange of the floor extending between a third mounting flange of the side wall and a reinforcing cap that extends between the floor and a longitudinally extending frame rail of the integrated vehicle frame, and further comprising a bolt joining together the third mounting flange of the floor, the third mounting flange of the side wall, and the reinforcing cap.

18. The vehicle as recited in claim 17, comprising a weld or an adhesive located outboard of the bolt and joining together the third mounting flange of the floor, the reinforcing cap, and a mounting flange of the longitudinally extending frame rail.

19. A vehicle, comprising:
a unibody truck bed assembly comprised of a cargo box and an integrated vehicle frame,
wherein the cargo box includes a floor and a side wall,
wherein the cargo box includes at least two different mating configurations between the floor and the sidewall, and
wherein each of the at least two different mating configurations is non-visible from within a cargo space established by the cargo box,
wherein a first mating configuration of the at least two different mating configurations includes a weld located outboard of an interior surface of the side wall, and a second mating configuration of the at least two different mating configurations includes a bolt located outboard of the interior surface of the side wall.

* * * * *